(12) United States Patent
Horne et al.

(10) Patent No.: US 9,213,122 B2
(45) Date of Patent: Dec. 15, 2015

(54) SINGLE WELL ANISOTROPY INVERSION USING VELOCITY MEASUREMENTS

(75) Inventors: Stephen Allan Horne, Tokyo (JP); John Walsh, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 70 days.

(21) Appl. No.: 13/237,937

(22) Filed: Sep. 21, 2011

(65) Prior Publication Data

US 2012/0078600 A1 Mar. 29, 2012

Related U.S. Application Data

(60) Provisional application No. 61/385,975, filed on Sep. 24, 2010.

(51) Int. Cl.
| | | |
|---|---|---|
| G06G 7/48 | (2006.01) | |
| G01V 1/42 | (2006.01) | |
| G01V 1/28 | (2006.01) | |

(52) U.S. Cl.
CPC . *G01V 1/42* (2013.01); *G01V 1/282* (2013.01)

(58) Field of Classification Search
CPC ......... G01V 1/28; G01V 1/282; G01V 1/284; G01V 1/30; G01V 1/303; G01V 1/306; G01V 1/32; G01V 1/325; G01V 1/40–1/50; G01V 11/00; G01V 2210/626; G01V 2210/63; G01V 2210/66; G01V 2210/665
USPC .......... 367/38, 73; 702/6, 11–13; 703/2, 5, 10
See application file for complete search history.

(56) References Cited

U.S. PATENT DOCUMENTS

| | | | | |
|---|---|---|---|---|
| 5,675,147 A | * | 10/1997 | Ekstrom et al. | ............... 250/256 |
| 2006/0100785 A1 | * | 5/2006 | Laurent et al. | .................. 702/14 |
| 2010/0312534 A1 | * | 12/2010 | Xu et al. | ........................... 703/2 |

OTHER PUBLICATIONS

Haldorsen et al., Borehole acoustic waves, Oilfield Review, 18.1, 2006.*
Li et al., An empirical method for estimation of anisotropic parameters in clastic rocks, The Leading Edge, Jun. 2006.*
Sayers, The Effect of Low Aspect Ratio Pores on the Seismic Anisotropy of Shales, SEG Expanded Abstract 2750-2754.*
Technology focus on perforating for optimal production, Oilfield Bulletin, Schlumberger, 2004.*
Walsh et al., Derivation of anisotropy parameters in a shale using borehole sonic data, ARMA 08-272 (2008).*
Hornby et al., "Do We Measure Phase or Group Velocity with Dipole Sonic Tools?", EAGE 65th Conference & Exhibition—Stavanger, Norway, Jun. 2-5, 2003.*
Hornby et al., Anisotropy correction for deviated-well sonic logs: Application to seismic well tie, Geophysics vol. 68, No. 2, 2003.*
Tang et al., Shear-Velocity Measurement in the Logging-While-Drilling Environment: Modeling and Field Evaluations, Petrophysics, vol. 44, No. 2, pp. 79-90, 2003.*

(Continued)

*Primary Examiner* — Eunhee Kim
(74) *Attorney, Agent, or Firm* — Daryl R. Wright; Wesley Noah

(57) ABSTRACT

At least one elastic parameter of a region of interest of a formation is modeled, and at least one velocity measurement acquired in a wellbore extending in the formation is predicted based on the modeling. The model is refined based on the predicted velocity measurement(s) and based on at least one actual measurement acquired from within a single wellbore.

20 Claims, 4 Drawing Sheets

(56) References Cited

OTHER PUBLICATIONS

R.K. Mallan, J. Ma, and C. Torres-Verdin, "3D Numerical Simulation of Borehole Sonic Measurements Acquired in Dipping, Anisotropic, and Invaded Formations", SPWLA 50 Annual Logging Symposium, 2009, pp. 1-13.

Thomsen, Leon, "Weak Elastic Anisotropy", Geophysics 51 (Oct.) 1954-1966.

Musgrave, M. J. P., "Crystal Acoustics" (Holden-Day 1970).

Auld, B. A., "Acoustic Fields and Waves in Solids" (Kreiger Publishing Co. 1990).

Hornby, B., Howie, J., and Ince, D., "Anisotropy Correction for Deviated-Well Sonic Logs: Application to Seismic Well Tie", SEG Expanded Abstracts., 1999.

Sayers, C. M., 2008, "The Effect of Low Aspect Ratio Pores on the Seismic Anisotropy of Shales", SEG Expanded Abstract 2750-2754.

Sondergeld, C. H., Chandra, S. R., Margesson, R. W., & Whidden, K.J., "Ultrasonic Measurement of Anisotropy on the Kimmeridge Shale", SEG Annual Meeting Expanded Abstracts, 2000.

\* cited by examiner

SINGLE WELL ANISOTROPY INVERSION USING VELOCITY MEASUREMENTS

This application claims the benefit under 35 U.S.C. §119 (e) to U.S. Provisional Patent Application Ser. No. 61/385,975, entitled, "SYSTEM AND METHOD FOR SINGLE-WELL ANISOTROPY INVERSION USING SONIC MEASUREMENTS," which was filed on Sep. 24, 2010, and is hereby incorporated by reference in its entirety.

BACKGROUND

Hydrocarbon fluids, such as oil and natural gas, are obtained from a subterranean geologic formation by drilling one or more wellbores and installing completion equipment in the wellbores to enable the extraction of fluids from the reservoir. Surface equipment is also provided to route or store the extracted fluids.

A variety of different operations may be performed for purposes of enhancing the extraction of fluid. For example, perforating operations may be performed to fire shaped charges to pierce the well casing (if any) and form perforating tunnels into the reservoir. Well stimulation operations, such as acidizing and hydraulic fracturing operations, which involve injecting a fluid at relatively high pressure through a wellbore into the reservoir to cause fracturing of the formation, may also be employed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with embodiments, at least one elastic parameter of a region of interest of a formation is modeled, and at least one velocity measurement acquired in a single wellbore extending in the formation is predicted based on the modeling. The model is refined based on the predicted velocity measurement(s) and based on at least one actual measurement acquired from within the single wellbore.

BRIEF DESCRIPTION OF THE DRAWINGS

Embodiments of single well anisotropy using velocity measurements are described with reference to the following figures. The same numbers are used throughout the figures to reference like features and components. It should be understood, however, that the accompanying figures illustrate only the various implementations described herein and are not meant to limit the scope of various technologies described herein. The figures are as follows.

DETAILED DESCRIPTION

Figure 1:
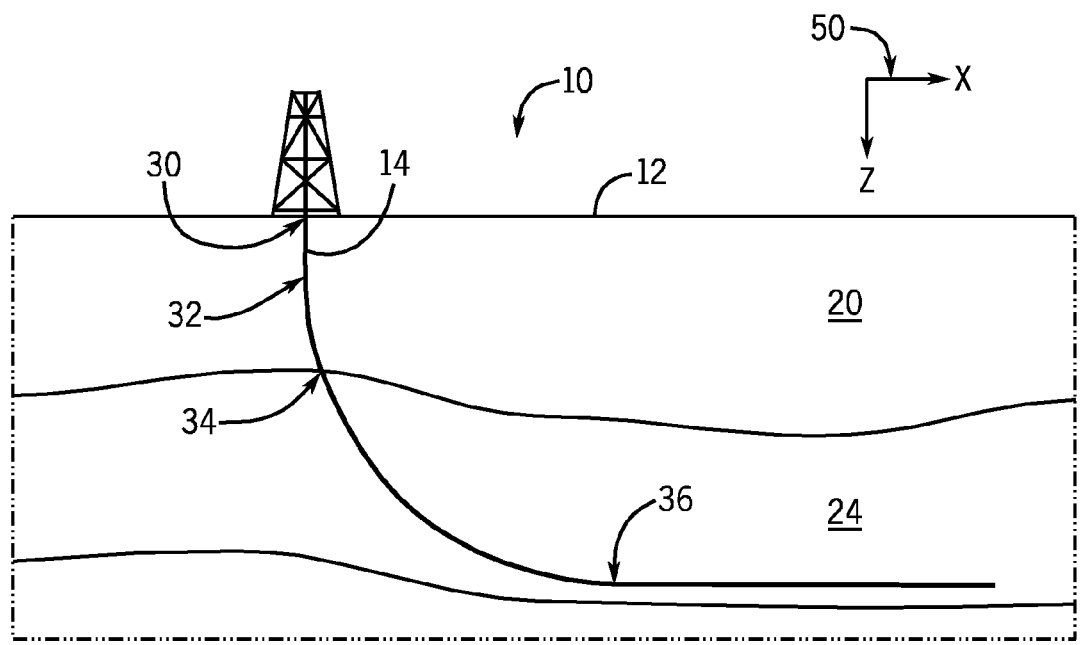
FIG. 1 is a schematic diagram of a well.

Illustrative embodiments and aspects are described below. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

Knowledge of the mechanical rock properties, or elastic parameters, of a subterranean geologic formation may be used for a wide variety of purposes in the planning, drilling, completion and production phases of a well. In this manner, the formation's elastic parameters may be used for such purposes as well completion design, avoiding wellbore instability, designing hydraulic fractures and monitoring hydraulic fracturing from micro-seismic events.

The elastic parameters of a given formation may be directionally dependent, or exhibit anisotropy. More specifically, a given formation may exhibit vertical transverse isotropy (VTI). The physical properties of a VTI material are identical when measured with respect to a symmetry axis but otherwise vary with direction (i.e., otherwise are anisotropic in nature). In the case of many sedimentary layers, these layers are generally horizontal, and the resulting symmetry axis is vertical. Therefore, measurements acquired in radial directions about the vertical axis do not vary with respect to direction, but measurements acquired in other directions are dependent on the direction. For a VTI material, the elastic stiffness tensor may be described using a reduced set of five elastic constants, or parameters: $C_{11}$, $C_{33}$, $C_{44}$, $C_{66}$ and $C_{13}$.

The $C_{11}$, $C_{33}$, $C_{44}$, $C_{66}$ and $C_{13}$ parameters describe the velocity variations for three different wave types: the quasi-compressional wave (qP), the quasi shear-wave polarized in the vertical plane (qSv) and a true shear-wave polarized in the horizontal plane (SH). The behaviors of the quasi-compressional waves qP and quasi shear-waves qSv are described by the $C_{11}$, $C_{33}$, $C_{44}$ and $C_{13}$ parameters. The behavior of the SH wave is described by the $C_{44}$, and $C_{66}$ elastic parameters.

In accordance with embodiments that are disclosed herein, for purposes of determining the elastic parameters for a given formation (such as a formation that is assumed to be VTI, for example) a sonic measurement tool may first be deployed in a wellbore that extends into the formation for purposes of acquiring velocity measurements at several different angles. Thus, the measurements are associated with different directions, and in general, the deviation of the well at a given measurement site controls the direction of the measurement.

For a formation that formed from a material that is considered to be a VTI material and for a wellbore segment inside the formation, which is deviated (i.e., not vertical), the velocity measurements are, in general, acquired in various directions that are not orthogonal to the symmetry axis (the vertical axis, for example) of the formation. Therefore, due to the anisotropy that is exhibited by the VTI material, the wave speeds that are measured using the sonic measurement tool are, in general, directionally dependent.

In accordance with embodiments disclosed herein, a model (the C11, C33, C44, C66 and C13 parameters, for example) for the elastic parameters of a formation of interest is derived using the actual velocity measurements that are acquired by a sonic measurement tool from within a single deviated wellbore that extends in the formation.

Turning now to a more specific example, referring to FIG. 1, a well 10 may contain a wellbore 14, which initially (from the Earth surface) extends vertically through an upper overburden formation 20 and then deviates from the vertical orientation to extend laterally in a lower formation 24 of interest. As an example, the upper overburden formation 20 may be generally isotropic, and the lower formation 24 may be a relatively low permeability shale formation that may be considered VTI. A deviation 60 of the wellbore 14 with respect to depth is illustrated in FIG. 2.

Figure 2:
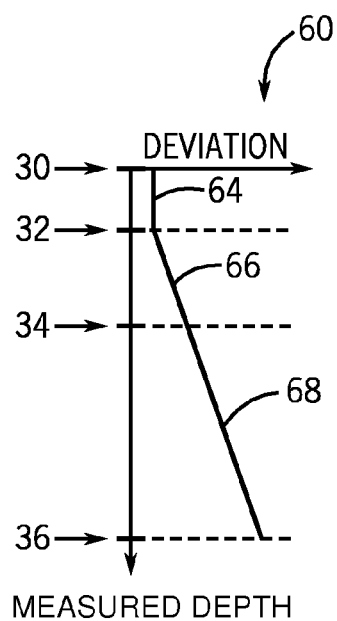
FIG. 2 is a plot of a deviation of the well of FIG. 1 versus depth.

More particularly, FIG. 2 depicts the deviation 60 of the wellbore 14 of FIG. 1 as a function of distance along the borehole. Referring to FIG. 2 in conjunction with FIG. 1, near the Earth surface, the wellbore 14 extends from an Earth surface point 30 in a near vertical segment 64 to a point 32 at which the wellbore 14 begins deviating away from a vertical orientation. In this regard, from the point 32 to a point 34 (at the adjacent boundaries of the formations 20 and 24), the deviation increases along segment 66 and continues to increase in a segment 68 between the point 34 and 36. Near and extending past point 36, the wellbore 14 becomes substantially horizontal for this example.

For purposes of determining elastic parameters for the formation 24, a sonic measurement tool may be disposed in the wellbore 14 and used to acquire velocity measurements at several locations in the segment of the wellbore 14 between the points 34 and 36. The velocity measurements may be measurements of vertically polarized shear waves; horizontally polarized shear waves; compressional waves; flexural waves, quadrupole waves, monopole head waves, and/or Stoneley waves, depending on the particular embodiment. As non-limiting examples, the velocity measurements may be acquired while the wellbore 14 is being drilled (using a logging while drilling (LWD) sonic measurement tool, for example); or the velocity measurements may be acquired after the drilling phase is complete using, for example, a sonic measurement tool that is deployed downhole on a wireline or on another type of conveyance mechanism.

Due to the anisotropy that is exhibited by the formation 24, the sonic measurement tool acquires velocity measurements in directions at some angle to the symmetry axis (here, the "Z" axis). For example, the sonic measurement tool may acquire velocity measurements that are generally orthogonal with respect to the trajectory of the wellbore 14, and therefore, the directions of the velocity measurements vary with the tool's location. Due to the VTI nature of the formation 24, the velocity measurements vary with direction, even though the formation 24 may be homogeneous.

Figure 3:
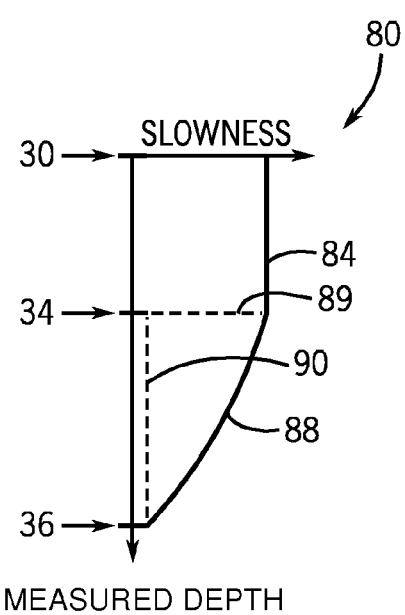
FIG. 3 is a plot of a slowness versus depth for the well of FIG. 1.

More specifically, referring to FIG. 3 in conjunction with FIG. 1, a measured slowness 80 (the inverse of velocity) varies with the depth of the wellbore 14. In this manner, a segment of the slowness 80 associated with the overburden formation 20 is relatively constant, i.e., the slowness 80 varies little from point 30 to the point 34, due to the formation 20 being isotropic. However, in the formation 24 of interest, the slowness 80 varies with depth as the trajectory of the wellbore 14 changes (i.e., the measurement angle changes), as indicated by segment 88 (see FIG. 3). It is noted that if the formation 24 were hypothetically isotropic instead of anisotropic, the slowness would be constant, as indicated by dashed lines 89 and 90 in FIG. 3.

Systems and techniques are disclosed herein, which analyze the velocity/slowness variations with respect to the well deviation to estimate one or more of the elastic parameters associated with the formation 24. The determined elastic parameters may then be used for purposes of conducting and planning various oilfield activities, such as activities related to well completion, wellbore stability design, hydraulic fracturing design, hydraulic fracturing monitoring and pre-stack depth migration.

Figure 4:
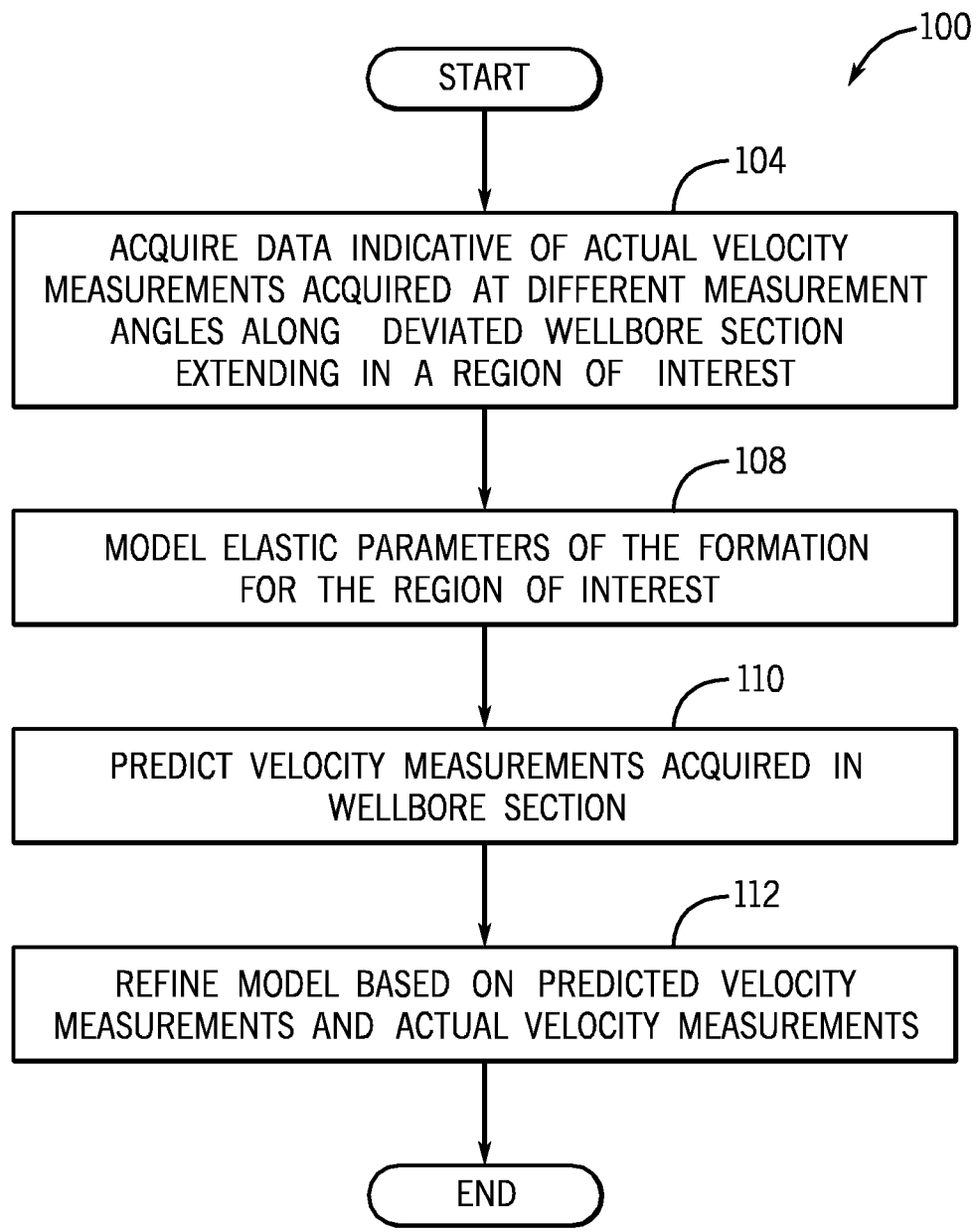
FIGS. 4 and 5 are flow diagrams depicting techniques to determine a model for at least one elastic parameter according to some embodiments.

More specifically, referring to FIG. 4, a technique 100 in accordance with embodiments includes acquiring (block 104) data indicative of actual velocity measurements at different measurement angles along a single wellbore, i.e., along a deviated wellbore section of a single wellbore, which extends in a region of interest of a given formation. The technique 100 includes modeling (block 108) elastic parameters of the formation as a function of velocity for the region of interest and predicting (block 110) velocity measurements acquired in the deviated wellbore section. The technique 100 includes refining (block 112) the model based on the predicted velocity measurements and the actual velocity measurements.

Depending on the particular embodiment, the predicted velocity measurements may be derived using full waveform modeling or using samples of group velocity vectors in different directions.

As a first example, in accordance with some embodiments, a three-dimensional (3-D) finite difference technique may be used to determine the full waveform data, which may then be used in an objective function to match the observed waveforms to synthetically generated waveforms. As non-limiting example, the 3-D finite difference technique may be used that is disclosed in Mallan, R K, Jun Ma, and Carlos Torres-Verdin, 3D NUMERICAL SIMULATION OF BOREHOLE SONIC MEASUREMENTS ACQUIRED IN DIPPING, ANISOTROPIC, AND INVADED FORMATIONS SPWLA 50 Annual Logging Symposium, 2009. For purposes of reducing computation costs, the computation and velocity from a point source (i.e., "group velocities") located in a homogeneous medium is sufficiently accurate and may be achieved using fewer computing resources. In the case of weak anisotropy, plane-wave velocities (i.e., "phase velocities") located in a homogeneous medium may be appropriate.

As a second example, the model of the elastic parameters may be refined using samples of group velocity vectors in different directions. In this manner, for materials possessing transverse isotropy, analytical expressions exist for the plane-wave velocity (also called "phase velocity") variations, such as the expressions that are set forth in Thomsen, Leon, WEAK ELASTIC ANISOTROPY *Geophysics* 51 (October): 1954-1966. Such plane-wave velocity expressions are appropriate in the case that the source excites plane waves or the anisotropy is weak. In the case that the source is more accurately represented as a point source, the velocities that are measured are the group velocities for which no exact analytical expression exists to compute the quasi-compressional qP and quasi shear-wave qSV group velocities for a given group direction. These "point-source," or group velocities may, however, be determined for a given plane-wave direction by solving the Kelvin-Christoffel equation and then computing the group velocity vector whose direction gives the group direction. As non-limiting examples, a technique such as the one disclosed in Musgrave, M. J. P., CRYSTAL ACOUSTICS (Holden-Day 1970) or the one disclosed in Auld, B. A., ACOUSTIC FIELDS AND WAVES IN SOLIDS (Kreiger Publishing Co. 1990) may be used. For dipole sonic logs, the velocities that are measured are the group velocities.

In accordance with some embodiments, a model describing the relationship of the elastic parameters (the five constants of the stiffness tensor for a VTI formation, for example) is first estimated. From this model, group velocity vectors are sampled over different directions, such as directions in a range of possible directions given the trajectory of the wellbore 14, for purposes of forming a lookup table of group velocities that are indexed by measurement trajectories. The look up table is then searched to find the point-source (group) directions that are close to the well deviations of the observed, or acquired, velocity measurements that are acquired by the sonic measurement tool. The acquired velocity measurements are then compared to corresponding velocity measurements in the look-up table for purposes of refining the model.

More specifically, in accordance with some embodiments, the predicted velocities from the look-up table and the actual, acquired velocity measurements are used to evaluate an objective function, such as an example objective function (called "f(m)") that is set forth below:

$$f(m) = \sum_{i=1}^{N} \left| \frac{V_{Obs,i} - V_{Syn,i}}{\Delta V_i} \right|,\qquad \text{Eq. 1}$$

where "m" represents a model describing the formation's elastic properties (such as the five constants of the stiffness tensor for a VTI formation, for example); "N" represents the number of actual velocity measurements available from the sonic log; "i" represents an index; "$V_{Obs,i}$" represents the "ith" observed, or acquired velocity measurement; and "$V_{Syn,i}$" represents the "ith" predicted velocity measurement from the look-up table that is closest in direction to the $V_{Obs,i}$ velocity measurement; and "$\Delta V_i$" represents the error associated with the $V_{Obs,i}$ velocity measurement. An iterative process is used to minimize the f(m) objective function for purposes of determining the elastic parameters.

Figure 5:
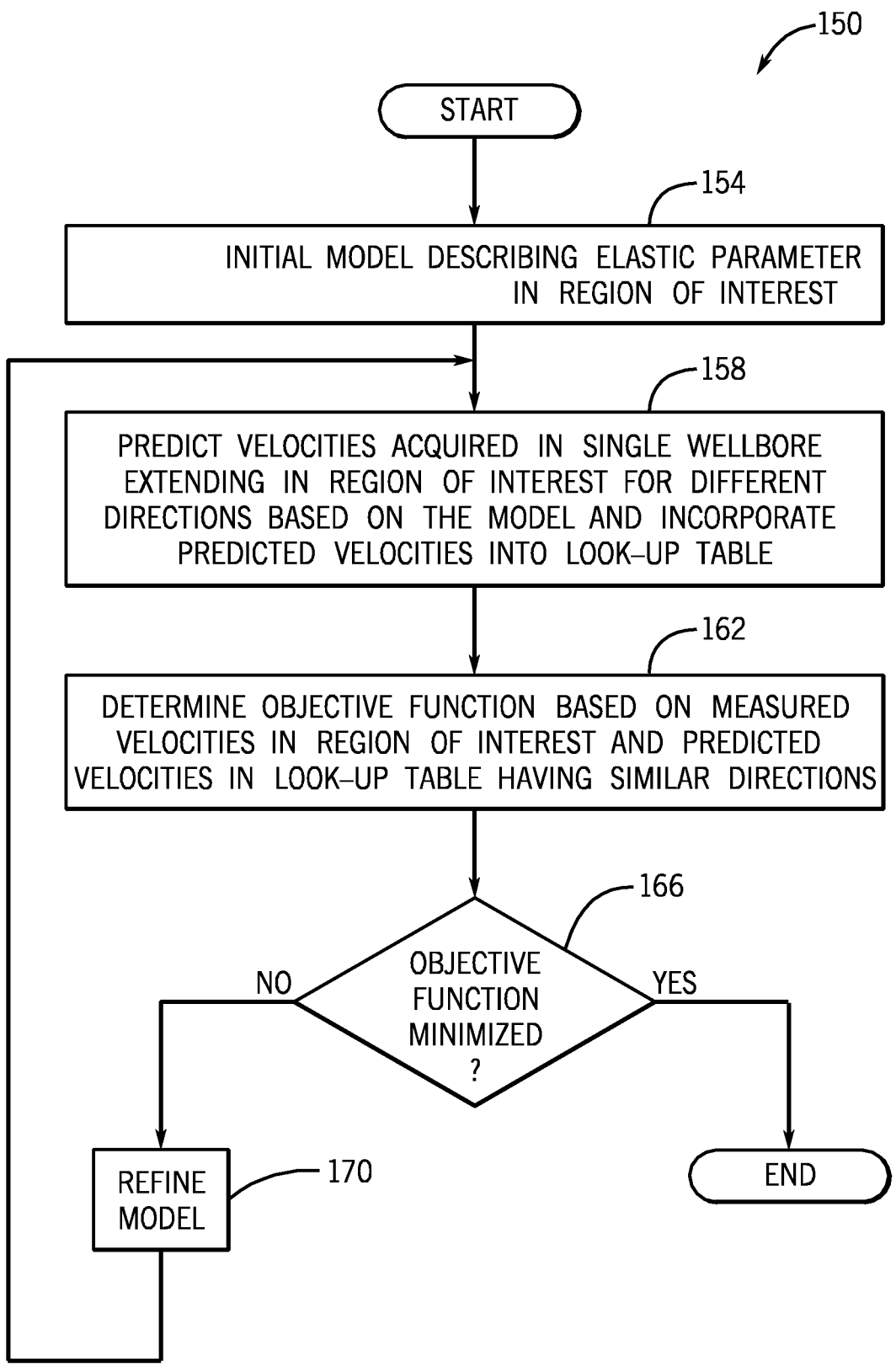

More specifically, referring to FIG. 5, a technique 150 may be used for purposes of determining at least one elastic parameter for a formation of interest in accordance with embodiments. Pursuant to the technique 150, an initial model describing at least one elastic parameter is estimated (block 154) in a region of interest. Next, pursuant to the technique 150, an iterative process begins in which the objective function is minimized for purposes of refining the model. In this manner, the technique 150 includes predicting (block 158) velocities acquired in a single wellbore that extends in the region of interest for different directions based on the model and incorporating the predicted velocities into a look-up table, pursuant to block 158.

Next, the technique 150 includes determining (block 162) an objective function based on measured velocities in the region of interest and the predicted velocities (found in the look-up table) having similar associated directions. The objective function is then evaluated such that a determination may be made (decision block 166) whether the objective function has been sufficiently minimized. In this manner, several iterations may be performed for purposes of evaluating the objective function, changing the model and then re-evaluating the objective function for purposes of minimizing the function. If the objective function has not been sufficiently minimized, the technique 150 includes refining (block 170) the model (changing the C11, C33, C44, C66 and C13 parameters, for example) and returning to block 158. Otherwise, the objective function has been minimized, thereby determining the elastic parameter(s).

Thus, in accordance with embodiments disclosed herein, the elastic parameters are determined from predicted velocity measurements and actual velocity measurements acquired with a single wellbore without relying on actual velocity measurements acquired from any other wellbore. The velocity measurements may be measurements of one or more of horizontal shear wave velocities, vertical shear wave velocities, Stoneley wave velocities and compression wave velocities or any wave generated by a sonic tool of any type of conveyance from which compressional or shear wave velocities may be inferred. Moreover, the measurements do not have to be made in a nearly horizontal or nearly vertical well; and weak anisotropy is not necessarily assumed.

The elastic parameters and model that are determined using the techniques that are disclosed herein may be used for a wide variety of purposes. For example, using the determined elastic parameters, a velocity model may be constructed for purposes of locating microseismic events that are produced by hydraulic fracturing operations. The determined anisotropic characteristics may be used to correct the velocity measurements to account for the well deviation as described by Hornby, B., Howie, J., and Ince, D., ANISOTROPY CORRECTION FOR DEVIATED-WELL SONIC LOGS: APPLICATION TO SEISMIC WELL TIE, SEG Expanded Abstracts., 1999; and Hornby, B., Howie, J., and Ince, D., ANISOTROPY CORRECTION FOR DEVIATED-WELL SONIC LOGS: APPLICATION TO SEISMIC WELL TIE, Geophysics 68(2), 2003.

Another way in which the elastic parameters may be used is for determining attributes related to the anisotropy. For example, a particularly useful attribute is the Bn/Bt ratio, which is related to the gas saturation in shales, Sayers, C. M., 2008, THE EFFECT OF LOW ASPECT RATIO PORES ON THE SEISMIC ANISOTROPY OF SHALES, SEG Expanded Abstract 2750-2754. Thus, the anisotropy measurement can potentially be used as a prediction of future production of the formation. The anisotropy parameters may be used to determine the total organic content (TOC) in shales as disclosed in Sondergeld, C. H., Chandra, S. R., Margesson, R. W., & Whidden, K. J., ULTRASONIC MEASUREMENT OF ANISOTROPY ON THE KIMMERIDGE SHALE, SEG Annual Meeting Expanded Abstracts, 2000, a correlation exists between TOC and shale anisotropy parameters. Therefore, the techniques and systems that are disclosed herein may be used as an indicator or even a measure of TOC.

As another example, the elastic parameter(s) may be used for purposes of planning a perforation operation to be conducted in the formation 24. In this manner, the orientations of the perforating charges, the clustering of the perforating charges, the locations of groups of perforating charges, distances between perforating charges, and so forth may be chosen based on the determined elastic parameters. Thus, many variations are contemplated and are within the scope of the appended claims.

Figure 6:
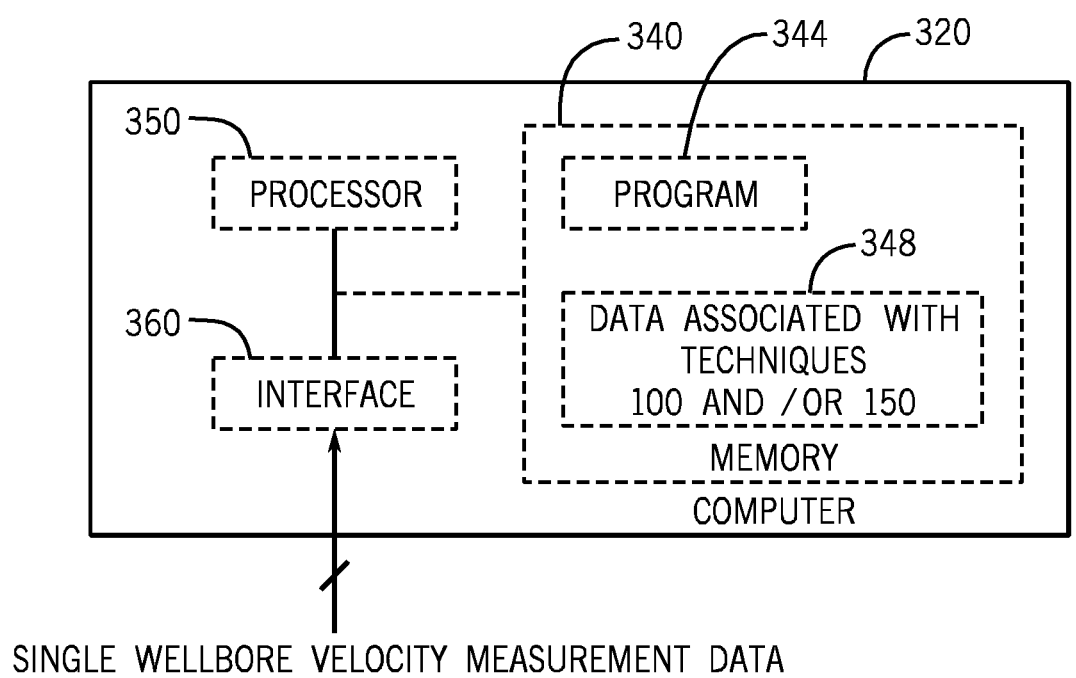
FIG. 6 is a schematic diagram of a data processing system according to some embodiments.

Referring to FIG. 6, in accordance with some embodiments, a data processing system 320, or computer, may contain a processor 350 for purposes of determining a model for at least one elastic parameter of a region of interest of a formation using velocity measurements acquired from within a single wellbore that extends in the region of interest. In this manner, using the processor 350, the system 320 may contain a model, a predictor and an adjuster that models at least one elastic parameter of a region of interest of a formation as a function; predicts (via the predictor) at least one velocity measurement acquired in a wellbore extending in the formation based on the model; and refines (via the adjustor) the model based on the at least one predicted velocity measurement and at least one actual velocity measurement acquired from within the single wellbore.

In accordance with some embodiments, the processor 350 may be formed from one or more microprocessors and/or microprocessor processing cores. As non-limiting examples, the processor 350 may be disposed at a well site, may be disposed remotely from the well site or may, in general, be a processing system that may be at one location or may be spatially distributed at various locations, in accordance with the many possible different embodiments.

As depicted in FIG. 6, the processor 350 may be coupled to a communication interface 360 for purposes of receiving pressure and particle motion data. As examples, the communication interface 360 may be a Universal Serial Bus (USB) interface, a network interface, a removable media interface (a flash card, CD-ROM interface, etc.) or a magnetic storage interface (IDE or SCSI interfaces, as non-limiting examples). Thus, the communication interface 360 may take on numerous forms, depending on the particular embodiment.

In accordance with some embodiments, the processor 350 is coupled to a memory 340, which stores program instructions 344, which when executed by the processor 350, may cause the processor 350 to perform various tasks of one or more of the techniques that are disclosed herein, such as the techniques 100 and/or 150, as non-limiting examples. The memory 340 may store information characterizing the model and may use data for a look-up table of sampled, predicted velocity measurements.

The memory 340 is a non-transitory memory and may take on numerous forms, such as semiconductor storage, magnetic storage, optical storage, phase change memory storage, capacitor-based storage, etc., depending on the particular implementation. Furthermore, the memory 340 may be formed from more than one of these non-transitory memories, in accordance with some embodiments. When executing the program instruction 344, the processor 340 may also, for example, store preliminary, intermediate and/or final results obtained via the execution of the program instructions 344 as data 348 in the memory 340.

The data processing system 320 is merely an example of one out of many possible architectures for processing velocity measurements, modeling elastic parameters and predicting velocity measurements, in accordance with the techniques that are disclosed herein. Moreover, the data processing system 320 is represented in a simplified form, as the processing system 320 may have various other components (a display to display initial, intermediate or final results of the system's processing, as a non-limiting example), as can be appreciated by the skilled artisan. Thus, many variations are contemplated and are within the scope of the appended claims.

While a limited number of embodiments have been disclosed herein, those skilled in the art, having the benefit of this disclosure, will appreciate numerous modifications and variations there from. It is intended that the appended claims cover all such modifications and variations.

What is claimed is:

1. A computer implemented method for determining an elastic parameter of a region of interest in a formation traversed by a wellbore, comprising:

inputting into the computer actual group velocity measurements and actual directions acquired from running a sonic measurement tool within the region of interest;

constructing a computer model of the elastic parameter of the region of interest;

computing predicted group velocity measurements and predicted directions based on the computer model;

constructing a look up table containing the predicted group velocity measurements and the predicted directions;

selecting a look up table predicted group velocity measurement for comparison to one of the actual group velocity measurements based on proximity between a corresponding look up table predicted direction and corresponding one of the actual directions; and refining the computer model based on the look up table predicted group velocity measurement and the one of the actual group velocity measurements such that an objective function is minimized, without relying on any other actual velocity measurements acquired from another wellbore.

2. The method of claim 1, wherein the act of constructing the computer model is based on an assumption that the region of interest is vertically transverse isotropic.

3. The method of claim 1, further comprising computing a perforating plan for the region of interest based at least in part on an optimized refined computer model resulting when the objective function is minimized.

4. The method of claim 1, wherein the actual group velocity measurements and the actual directions comprise measurements computed from compressional waves.

5. The method of claim 1, wherein the wellbore changes direction in the region of interest.

6. The method of claim 1, wherein the actual group velocity measurements and the actual directions comprise measurements computed from flexural waves.

7. The method of claim 1, wherein the actual group velocity measurements and the actual directions comprise measurements computed from quadrupole waves.

8. The method of claim 1, wherein the actual group velocity measurements and the actual directions comprise measurements computed from monopole head waves.

9. The method of claim 1, wherein the actual group velocity measurements and the actual directions comprise measurements computed from Stoneley waves.

10. A system for determining an elastic parameter of a region of interest in a formation traversed by a wellbore comprising:

a processor;

a machine readable non-transitory media comprising machine readable instructions and actual group velocity measurements and actual directions acquired from running a sonic measurement tool within the region of interest;

wherein when the instructions are processed by the processor, the processor performs:

constructing a model of the elastic parameter of the region of interest;

computing predicted group velocity measurements and predicted directions based on the model;

constructing a look up table containing the predicted group velocity measurements and the predicted directions;

selecting a look up table predicted group velocity measurement for comparison to one of the actual group velocity measurements based on proximity between a corresponding look up table predicted direction and corresponding one of the actual directions; and refining the model based on the look up table predicted group velocity measurement and the one of the actual group velocity measurements such that an objective function is minimized without relying on any other actual velocity measurements acquired from another wellbore.

11. The system of claim 10, wherein the elastic parameter comprises a value characterizing an elastic stiffness tensor.

12. The system of claim 10, wherein the processor further performs: planning an operation for the wellbore based at least in part on an optimized refined model resulting when the objective function is minimized.

13. The system of claim 12, wherein planning the operation comprises determining a perforation scheme for perforating the region of interest.

14. The system of claim 10, wherein the wellbore changes direction in the region of interest.

15. The system of claim 10, wherein the actual group velocity measurements and the actual directions comprise measurements computed from compressional waves.

16. The system of claim 10, wherein the actual group velocity measurements and the actual directions comprise measurements computed from flexural waves.

17. The system of claim 10, wherein the actual group velocity measurements and the actual directions comprise measurements computed from quadrupole waves.

18. The system of claim 10, wherein the actual group velocity measurements and the actual directions comprise measurements computed from monopole head waves.

19. The system of claim 10, wherein the actual group velocity measurements and the actual directions comprise measurements computed from Stoneley waves.

20. The system of claim 10, wherein the act of constructing the model is based on an assumption that the region of interest is vertically transverse isotropic.

* * * * *